United States Patent
Bian et al.

(10) Patent No.: US 10,429,582 B1
(45) Date of Patent: Oct. 1, 2019

(54) WAVEGUIDE-TO-WAVEGUIDE COUPLERS WITH MULTIPLE TAPERS

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US); Steven M. Shank, Jericho, VT (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 15/968,997

(22) Filed: May 2, 2018

(51) Int. Cl.
*G02B 6/26* (2006.01)
*G02B 6/122* (2006.01)
*G02B 6/136* (2006.01)
*G02B 6/125* (2006.01)
*G02B 6/124* (2006.01)
*G02B 6/12* (2006.01)

(52) U.S. Cl.
CPC ............ *G02B 6/1228* (2013.01); *G02B 6/125* (2013.01); *G02B 6/136* (2013.01); *G02B 6/124* (2013.01); *G02B 2006/1215* (2013.01); *G02B 2006/12061* (2013.01); *G02B 2006/12176* (2013.01)

(58) Field of Classification Search
USPC .................................................... 385/14, 43
See application file for complete search history.

(56) References Cited

U.S. PATENT DOCUMENTS

| 3,785,717 | A | * | 1/1974 | Croset ............... G02B 6/12002 |
| | | | | 333/113 |
| 5,138,676 | A | | 8/1992 | Stowe et al. |
| 5,243,672 | A | | 9/1993 | Dragone |
| 6,724,968 | B2 | | 4/2004 | Lackritz et al. |
| 6,859,587 | B2 | | 2/2005 | Nikonov et al. |
| 6,901,196 | B2 | | 5/2005 | Takahashi et al. |
| 7,013,067 | B2 | | 3/2006 | Ghiron et al. |
| 7,016,587 | B2 | | 3/2006 | Kubby et al. |
| 7,095,920 | B1 | | 8/2006 | Little |
| 7,109,739 | B2 | | 9/2006 | Gothoskar et al. |
| 7,262,852 | B1 | | 8/2007 | Gunn, III et al. |
| 7,317,853 | B2 | | 1/2008 | Laurent-Lund et al. |
| 7,941,014 | B1 | | 5/2011 | Watts et al. |
| 8,213,751 | B1 | | 7/2012 | Ho et al. |

(Continued)

OTHER PUBLICATIONS

Sodagar et al., "High-efficiency and wideband interlayer grating couplers in multilayer Si/SiO2/SiN platform for 3D integration of optical functionalities", © 2014 Optical Society of America. Published Jul. 1, 2014, Optics Express vol. 22, No. 14.

(Continued)

*Primary Examiner* — Eric Wong
(74) *Attorney, Agent, or Firm* — Thompson Hine LLP

(57) ABSTRACT

Waveguide-to-waveguide couplers, systems that include waveguide-to-waveguide couplers, and methods of fabricating waveguide-to-waveguide couplers. A first waveguide is coupled to a first waveguide taper, and a second waveguide is coupled to a second waveguide taper. The first waveguide and the first waveguide taper are comprised of silicon, and the second waveguide and the second waveguide taper are comprised of silicon nitride. The second waveguide and the second waveguide taper are arranged in a vertical direction over the first waveguide and the first waveguide taper.

19 Claims, 14 Drawing Sheets

(56) References Cited

U.S. PATENT DOCUMENTS

| | | | |
|---|---|---|---|
| 9,122,006 B1 * | 9/2015 | Roth | G02B 6/126 |
| 9,234,854 B2 | 1/2016 | Assefa et al. | |
| 9,726,818 B1 * | 8/2017 | Yap | G02F 1/025 |
| 9,746,607 B2 * | 8/2017 | Collins | G02B 6/1228 |
| 9,778,416 B2 * | 10/2017 | Meade | G02B 6/1228 |
| 2002/0191916 A1 | 12/2002 | Frish et al. | |
| 2003/0223672 A1 | 12/2003 | Joyner et al. | |
| 2004/0114869 A1 | 6/2004 | Fike et al. | |
| 2005/0111779 A1 | 5/2005 | Joyner et al. | |
| 2005/0123244 A1 | 6/2005 | Block et al. | |
| 2009/0297093 A1 * | 12/2009 | Webster | G02B 6/1228 385/14 |
| 2010/0059822 A1 | 3/2010 | Pinguet et al. | |
| 2011/0267676 A1 | 11/2011 | Dallesasse et al. | |
| 2012/0224813 A1 * | 9/2012 | Chen | G02B 6/1228 385/43 |
| 2012/0288995 A1 | 11/2012 | El-Ghoroury et al. | |
| 2017/0205580 A1 | 7/2017 | Feng | |

OTHER PUBLICATIONS

Shang et al., "Low-loss compact multilayer silicon nitride platform for 3D photonic integrated circuits", © 2015 Optical Society of America. published Aug. 6, 2015, Optics Express vol. 23, No. 16.
Fathpour, S., "Emerging heterogeneous integrated photonic platforms on silicon", 2015, Nanophotonics, 4(1), pp. 143-164.

* cited by examiner

US 10,429,582 B1

WAVEGUIDE-TO-WAVEGUIDE COUPLERS WITH MULTIPLE TAPERS

BACKGROUND

The present invention relates to photonics chips and, more specifically, to waveguide-to-waveguide couplers, systems that include waveguide-to-waveguide couplers, and methods of fabricating waveguide-to-waveguide couplers.

Photonic chips, which integrate optical components and electronic components into a single platform, are capable of being used in many applications and many systems including, but not limited to, data communication systems and data computation systems. The electronic components may include, for example, field-effect transistors, and the optical components may include, for example, waveguides. Layout area, cost, and operational overhead, among other factors, may be reduced by including both types of components on a single photonics chip. On-chip communication and sensing may rely on transferring electromagnetic radiation through waveguides in the mid-infrared wavelength range of three (3) microns (μm) to eight (8) μm and, in certain instances, at wavelengths that are less than 3 μm, such as one (1) μm.

Improved waveguide-to-waveguide couplers, systems that include waveguide-to-waveguide couplers, and methods of fabricating waveguide-to-waveguide couplers are needed.

SUMMARY

In an embodiment of the invention, a structure is provided for a waveguide-to-waveguide coupler. The structure includes a first waveguide taper, a first waveguide coupled to the first waveguide taper, a second waveguide taper, and a second waveguide coupled to the second waveguide taper. The first waveguide and the first waveguide taper are comprised of silicon, and the second waveguide and the second waveguide taper are comprised of silicon nitride. The second waveguide and the second waveguide taper are arranged, when patterned, in a vertical direction over the first waveguide and the first waveguide taper.

In an embodiment of the invention, a method is provided for forming a waveguide-to-waveguide coupler. The method includes patterning a semiconductor layer to form a first waveguide taper and a first waveguide coupled to the first waveguide taper, depositing a dielectric layer over the first waveguide taper and the first waveguide, and patterning the dielectric layer to form a second waveguide taper and a second waveguide coupled to the second waveguide taper. The semiconductor layer is comprised of silicon, and the dielectric layer is comprised of silicon nitride. The second waveguide and the second waveguide taper are arranged in a vertical direction over the first waveguide and the first waveguide taper.

In an embodiment of the invention, a system includes an input grating coupler, a first plurality of optical components comprised of silicon nitride, a second plurality of optical components comprised of silicon nitride, and a multimode interference splitter arranged to couple with the input grating coupler with the first plurality of optical components and with the second plurality of optical components. The system further includes a waveguide-to-waveguide coupler arranged in a first optical path between the input grating coupler and the multimode interference splitter or in a second optical path that includes the first plurality of optical components. The waveguide-to-waveguide coupler includes a first waveguide taper comprised of single-crystal silicon and a second waveguide taper comprised of silicon nitride, and the second waveguide taper of the waveguide-to-waveguide coupler is arranged in a vertical direction over the first waveguide taper of the waveguide-to-waveguide coupler.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
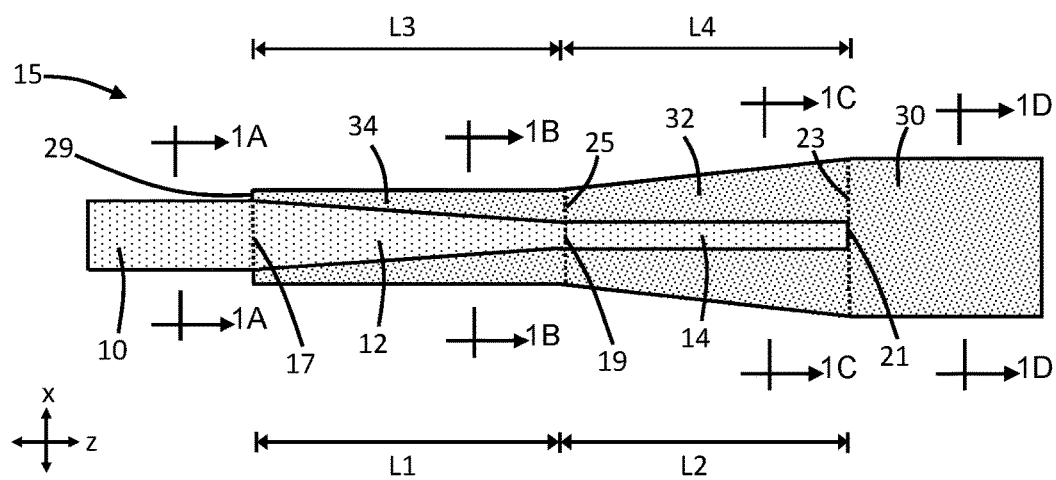
FIG. 1 is a bottom view of a photonics chip in accordance with embodiments of the invention and in which only the waveguides and waveguide tapers are shown to improve clarity of illustration.

With reference to FIGS. 1, 1A, 1B, 1C and in accordance with embodiments of the invention, a waveguide-to-waveguide coupler 15 includes a lower waveguide 10, a lower waveguide taper 12, and a lower waveguide 14 that are formed from a device layer of a silicon-on-insulator (SOI) substrate. The lower waveguide 10, lower waveguide taper 12, and lower waveguide 14 are arranged on a buried oxide (BOX) layer 16 of the SOI substrate, which is located over a handle wafer 18 of the SOI substrate. The BOX layer 16 operates as a lower cladding providing confinement for the lower waveguide 10, lower waveguide taper 12, and lower waveguide 14. The BOX layer 16 may be composed of an electrical insulator, such as silicon dioxide (e.g., $SiO_2$).

The lower waveguide taper 12 is laterally arranged between the lower waveguide 10 and the lower waveguide 14, and the lower waveguide 10, lower waveguide taper 12, and lower waveguide 14 may be aligned along a centerline 13. The lower waveguide taper 12 extends along the centerline 13 from a wide end 17 at its transition to the lower waveguide 10 to an opposite narrow end 19 at its transition to the lower waveguide 14. For purposes of illustration, the segmentation at the wide end 17 and the narrow end 19 is diagrammatically shown by dashed lines in FIG. 1. The lower waveguide 14 has an end 21, which may be a planar surface, that terminates the arrangement of the lower waveguide 10, lower waveguide taper 12, and lower waveguide 14. The lower waveguide 10 may serve as either an input to the waveguide arrangement or an output from the waveguide arrangement depending on the direction of light propagation through the waveguide-to-waveguide coupler 15.

The lower waveguide 10 has a width, w1, that is constant along its length. The lower waveguide 14 has a width, w2, that is constant along its length, L2, and that is less than the width, w1, of the lower waveguide 10. The lower waveguide taper 12 has a width that varies along its length, L1, from the width, w1, to the width, w2, so as to provide a connecting transition between the lower waveguide 10 and the lower waveguide 14.

The lower waveguide 10, lower waveguide taper 12, and lower waveguide 14 may be composed of a single-crystal semiconductor material, such as single-crystal silicon (Si), and may be patterned from the single-crystal semiconductor material of the device layer of the SOI substrate. In that regard, the lower waveguide 10, lower waveguide taper 12, and lower waveguide 14 are surrounded by shallow trench isolation (STI) regions 20 that may be formed by patterning the device layer of the SOI substrate to, for example, form trenches with lithography and etching, filling the trenches with a dielectric such as an oxide of silicon like silicon dioxide (e.g., $SiO_2$), and planarizing with chemical mechanical polishing (CMP). The STI regions 20 may extend completely through the device layer to the top surface of the BOX layer 16, and may be formed in trenches with different dimensions to provide the different widths and lengths for the lower waveguide 10, lower waveguide taper 12, and lower waveguide 14. The STI regions 20 operate as a lateral cladding providing confinement for the lower waveguide 10, lower waveguide taper 12, and lower waveguide 14.

Dielectric layers 22, 24, 26 are formed in a multilayer stack over a top surface of the lower waveguide 10, lower waveguide taper 12, lower waveguide 14, and STI regions 20. The dielectric layers 22, 26 may be composed of a dielectric material, such as an oxide of silicon like silicon dioxide ($SiO_2$) deposited by atomic layer deposition (ALD). Dielectric layer 24 may be composed of a dielectric material, such as silicon nitride ($Si_3N_4$) deposited by chemical vapor deposition (CVD). In an embodiment, the oxide of silicon constituting the dielectric layers 22, 26 may have a higher refractive index in the mid-infrared wavelength range of the electromagnetic spectrum than the oxide of silicon constituting the STI regions 20 or the oxide of silicon constituting the BOX layer 16. The material, e.g., silicon, constituting the lower waveguide 10, lower waveguide taper 12, and lower waveguide 14 has a higher index of refraction over the mid-infrared wavelength range than the materials, e.g., oxides of silicon and silicon nitride, constituting the STI regions 20, the BOX layer 16, and the dielectric layers 22, 24, 26.

The waveguide-to-waveguide coupler 15 further includes an upper waveguide 30, an upper waveguide taper 32, and an upper waveguide 34 that are arranged on the top surface of the dielectric layer 26 over the lower waveguide 10, lower waveguide taper 12, and lower waveguide 14. The upper waveguide 34 is arranged directly and primarily over the lower waveguide taper 12, and the upper waveguide taper 32 is arranged directly and primarily over the lower waveguide 14. The upper waveguide 30 does not overlie any portion of the lower waveguide arrangement and, similarly, the lower waveguide 10 does not underlie any portion of the upper waveguide arrangement. The upper waveguide taper 32 is arranged laterally between the upper waveguide 30 and the upper waveguide 34.

The upper waveguide 30, upper waveguide taper 32, and upper waveguide 34 may be aligned along their respective lengths with a centerline 33 that is displaced vertically from the centerline 13 and that is lengthwise parallel to the centerline 13. The upper waveguide taper 32 extends along the centerline 33 from an end 23 at its transition to the upper waveguide 30 to an opposite end 25 at its transition to the upper waveguide 34. For purposes of illustration, the segmentation at the wide end 23 and the narrow end 25 is diagrammatically shown by dashed lines in FIG. 1. The upper waveguide 34 terminates the arrangement of the upper waveguide 30, upper waveguide taper 32, and upper waveguide 34 at an end 29, which may be a planar surface, and that is coplanar with the wide end 17 of the lower waveguide taper 12. The upper waveguide 30 may serve as either an input to the waveguide arrangement or an output from the waveguide arrangement depending on the direction of light propagation through the waveguide-to-waveguide coupler 15.

The upper waveguide 30 has a width, w3, that is constant along its length, L3. The upper waveguide 34 has a width, w4, that is constant along its length, L4, and that is less than the width, w3, of the upper waveguide 30. In the representative embodiment, the length, L1, of the lower waveguide taper 12 is equal to the length, L3, of the upper waveguide 34, and the length, L2, of the lower waveguide 14 is equal to the length, L4, of the upper waveguide taper 32. The upper waveguide taper 32 has a width that varies along its length from the width, w3, to the width, w4, so as to provide a transition between the upper waveguide 30 and the upper waveguide 34. The change in width of the upper waveguide taper 32 results in tapering in a given direction (i.e., the negative z axis in the x-z plane) along its centerline 33 that is opposite to the direction (i.e., the positive z axis in the x-z plane) of the tapering of the lower waveguide taper 12 along its centerline 13. In addition, the lower waveguide taper 12 is narrower along its entire length than the upper waveguide taper 32. The upper waveguide 34, which has a constant width along its length, is wider than the lower waveguide 10, which also has a constant width along its length.

The upper waveguide 30, upper waveguide taper 32, and upper waveguide 34 may be composed of a dielectric material, such as silicon nitride ($Si_3N_4$) deposited by chemical vapor deposition (CVD) and patterned with a lithography and etching process, that has a higher index of refraction over the mid-infrared wavelength range than the material constituting the dielectric layers 22 and 26. The upper waveguide 30, upper waveguide taper 32, and upper waveguide 34 may be patterned with their respective widths and lengths from a layer of their constituent material by the lithography and etching process.

An interlayer dielectric layer 36 is formed over the upper waveguide 30, upper waveguide taper 32, upper waveguide 34, and dielectric layer 26. The interlayer dielectric layer 36 may be composed of a dielectric material, such as a low-k dielectric material like a carbon-doped oxide of silicon (SiO:C), deposited by chemical vapor deposition (CVD). In an embodiment, the material of the interlayer dielectric layer 36 may have a refractive index in the mid-infrared wavelength range of the electromagnetic spectrum that is less than the refractive index of the material constituting the upper waveguide 30, upper waveguide taper 32, and upper waveguide 34, and that is less than the refractive index of the materials constituting the STI regions 20 and the dielectric layer 22. In an embodiment, due to its composition, the material of the interlayer dielectric layer 36 may have a refractive index in the mid-infrared wavelength range of the electromagnetic spectrum that is less than the refractive index of silicon dioxide ($SiO_2$). The material, e.g., silicon nitride, of the upper waveguide 30, upper waveguide taper 32, and upper waveguide 34 has a higher index of refraction over the mid-infrared wavelength range than the material constituting the interlayer dielectric layer 36.

The waveguide-to-waveguide coupler 15 may be situated on a photonics chip. Light propagating in the positive-z direction is communicated from the arrangement of lower waveguide 10, lower waveguide taper 12, and lower waveguide 14 to the arrangement of the upper waveguide 30, upper waveguide taper 32, and upper waveguide 34. Light propagating in the negative-z direction is communicated from the arrangement of upper waveguide 30, upper waveguide taper 32, and upper waveguide 34 to the arrangement of the lower waveguide 10, lower waveguide taper 12, and lower waveguide 14. The photonics chip may include other types of electronic device structures and/or photonic device structures.

Figure 2:
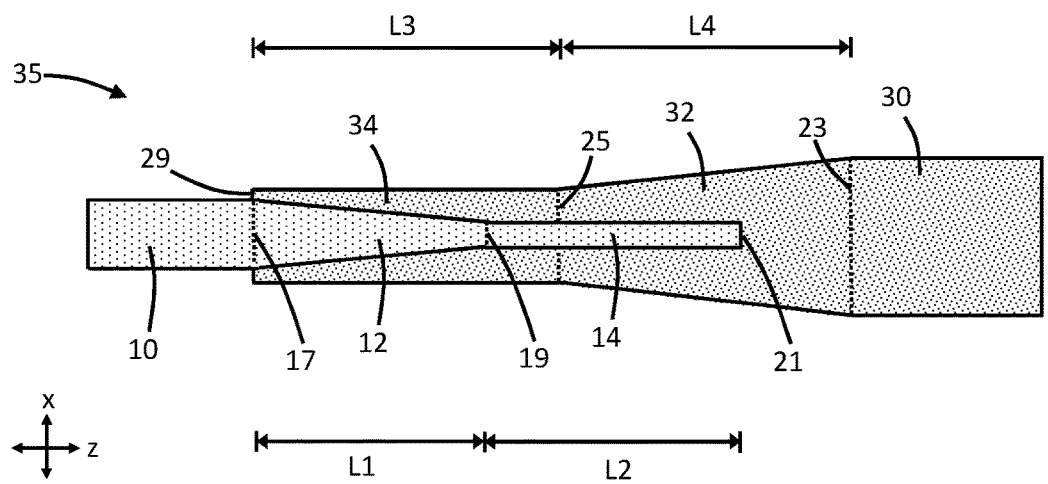
FIGS. 2-5 are bottom views similar to FIG. 1 of photonics chips in accordance with alternative embodiments of the invention.
Figure 1A:
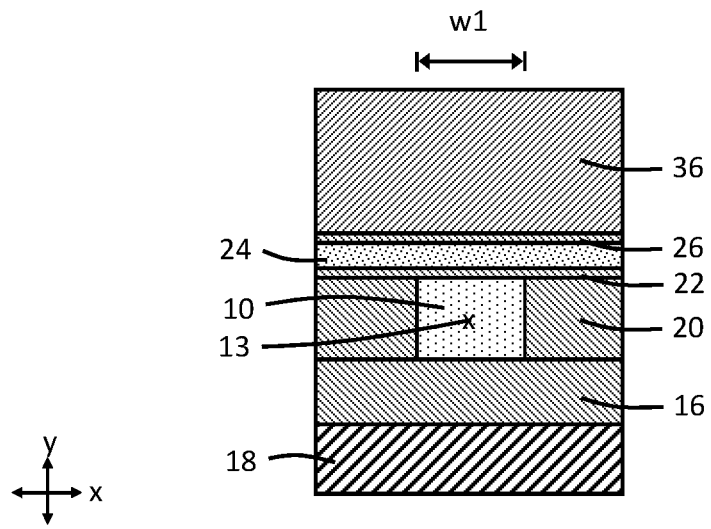
FIG. 1A is a cross-sectional view of the photonics chip taken generally along line 1A-1A in FIG. 1.
Figure 1B:
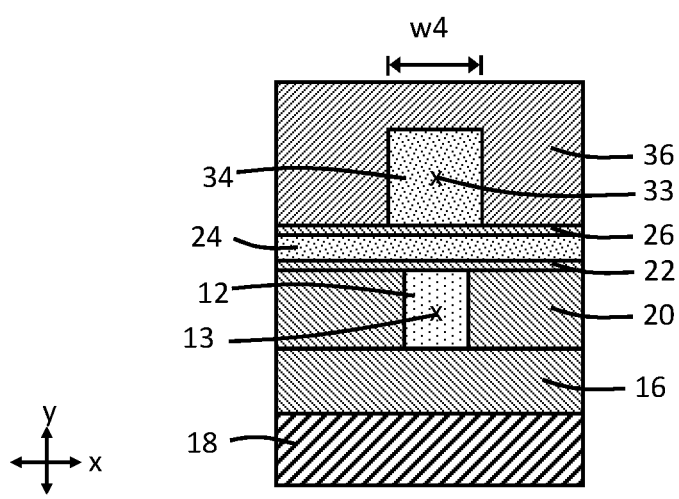
FIG. 1B is a cross-sectional view of the photonics chip taken generally along line 1B-1B in FIG. 1.
Figure 1C:
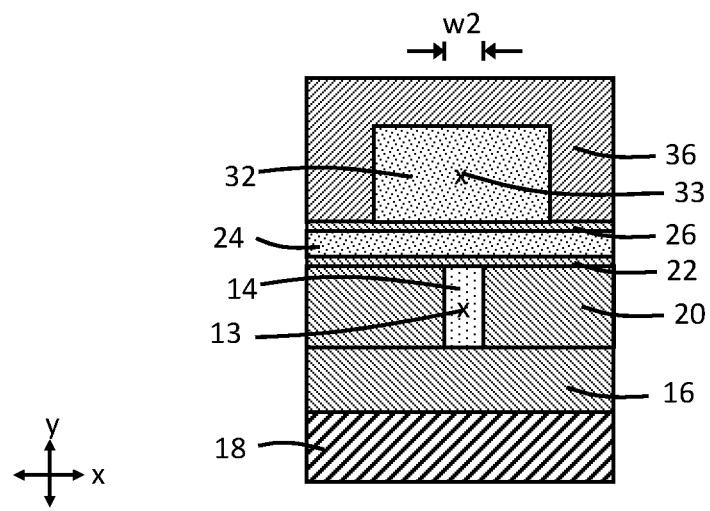
FIG. 1C is a cross-sectional view of the photonics chip taken generally along line 1C-1C in FIG. 1.
Figure 1D:
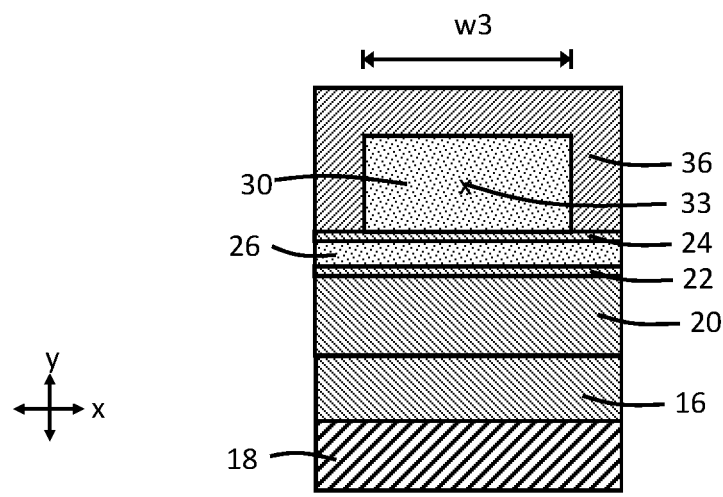
FIG. 1D is a cross-sectional view of the photonics chip taken generally along line 1D-1D in FIG. 1.

With reference to FIG. 2 in which like reference numerals refer to like features in FIG. 1 and in accordance with alternative embodiments of the invention, a waveguide-to-waveguide coupler 35 is a modified version of waveguide-to-waveguide coupler 15 in which the lengths of the lower waveguide taper 12 and lower waveguide 14 have been changed. In particular, the length, L1, of the lower waveguide taper 12 is less than the length, L3, of the upper waveguide 34, and the length, L2, of the lower waveguide 14 is less than or equal to the length, L4, of the upper waveguide taper 32. With these modifications, the total length of the lower waveguide taper 12 and lower waveguide 14 is less than the total length of the upper waveguide taper 32 and upper waveguide 34.

Figure 3:
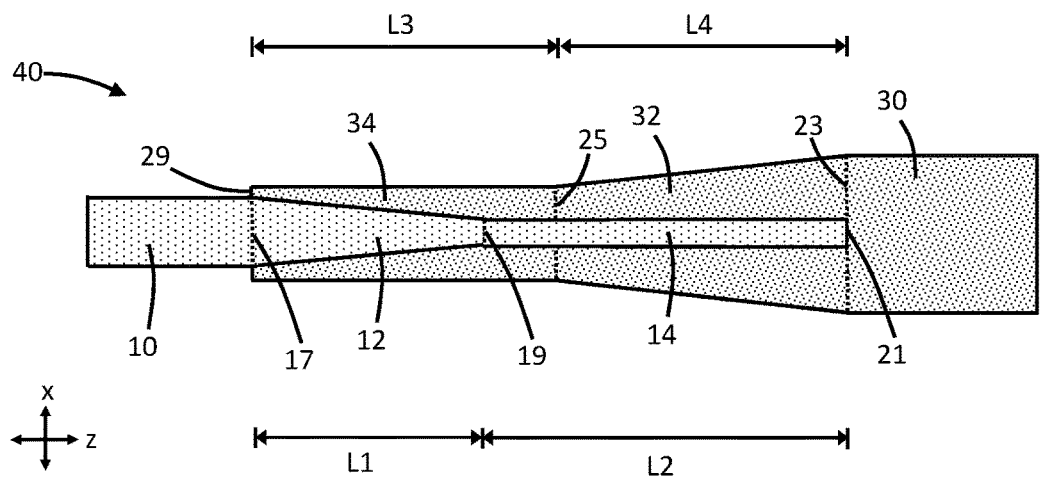

With reference to FIG. 3 in which like reference numerals refer to like features in FIG. 1 and in accordance with alternative embodiments of the invention, a waveguide-to-waveguide coupler 40 is a modified version of waveguide-to-waveguide coupler 15 in which the lengths of the lower waveguide taper 12 and lower waveguide 14 have been changed. In particular, the length, L1, of the lower waveguide taper 12 is less than the length, L3, of the upper waveguide 34, and the length, L2, of the lower waveguide 14 is greater than the length, L4, of the upper waveguide taper 32. With these modifications, the total length of the lower waveguide taper 12 and lower waveguide 14 and the total length of the upper waveguide taper 32 and upper waveguide 34 may be equal or unequal.

Figure 4:
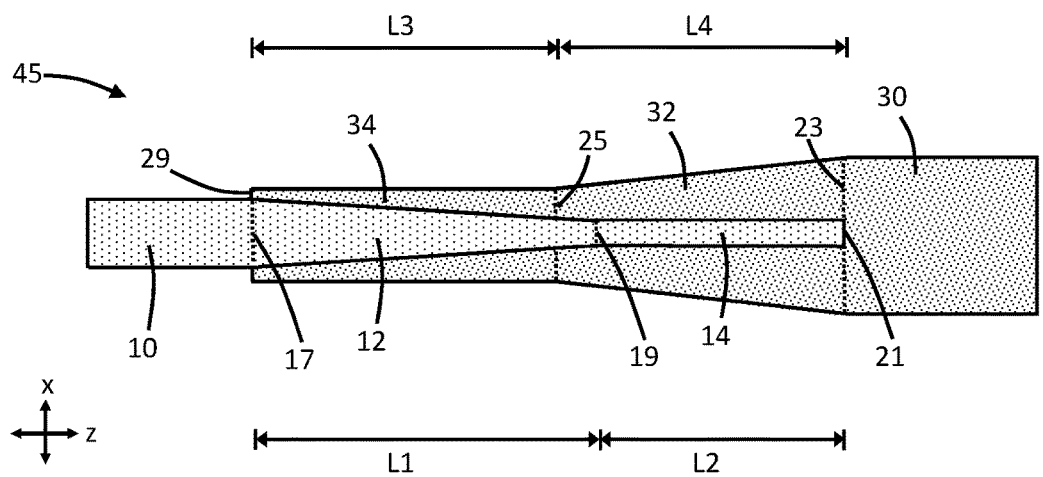

With reference to FIG. 4 in which like reference numerals refer to like features in FIG. 1 and in accordance with alternative embodiments of the invention, a waveguide-to-waveguide coupler 45 is a modified version of waveguide-to-waveguide coupler 15 in which the lengths of the lower waveguide taper 12 and lower waveguide 14 have been changed. In particular, the length, L1, of the lower waveguide taper 12 is greater than the length, L3, of the upper waveguide 34, and the length, L2, of the lower waveguide 14 is less than or equal to the length, L4, of the upper waveguide taper 32. With these modifications, the total length of the lower waveguide taper 12 and lower waveguide 14 and the total length of the upper waveguide taper 32 and upper waveguide 34 may be equal or unequal.

Figure 5:
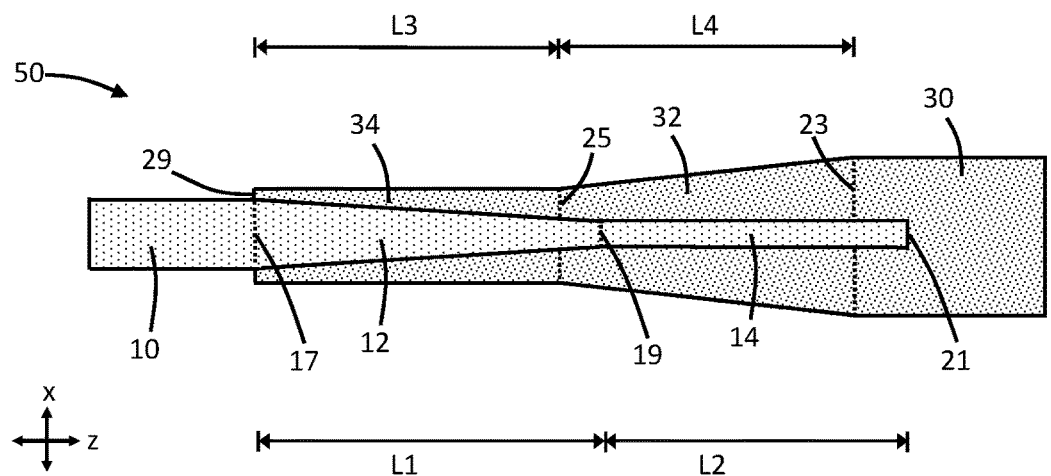

With reference to FIG. 5 in which like reference numerals refer to like features in FIG. 1 and in accordance with alternative embodiments of the invention, a waveguide-to-waveguide coupler 50 is a modified version of waveguide-to-waveguide coupler 15 in which the lengths of the lower waveguide taper 12 and lower waveguide 14 have been changed. In particular, the length, L1, of the lower waveguide taper 12 is greater than or equal to the length, L3, of the upper waveguide 34, and the length, L2, of the lower waveguide 14 is greater than or equal to the length, L4, of the upper waveguide taper 32. With these modifications, the total length of the lower waveguide taper 12 and lower waveguide 14 is greater than the total length of the upper waveguide taper 32 and upper waveguide 34.

Figure 6:
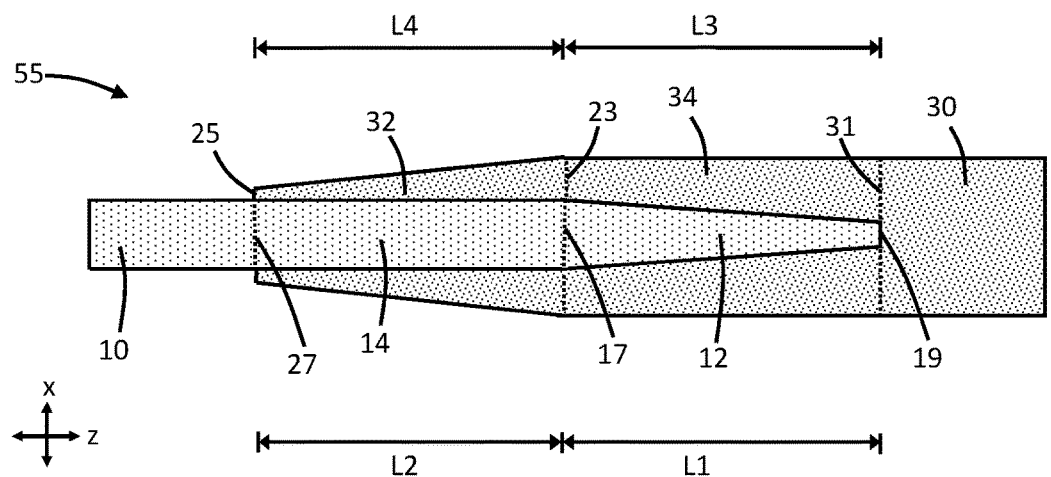
FIGS. 6-10 are bottom views similar to FIG. 1 of photonics chips in accordance with alternative embodiments of the invention.

With reference to FIG. 6 in which like reference numerals refer to like features in FIG. 1 and in accordance with alternative embodiments of the invention, a waveguide-to-waveguide coupler 55 is a modified version of waveguide-to-waveguide coupler 15 in which the lower waveguide taper 12 and lower waveguide 14 have been rearranged (i.e., swapped in position) to place the lower waveguide 14 between the lower waveguide taper 12 and the lower waveguide 10, and the upper waveguide taper 32 and upper waveguide 34 have been rearranged (i.e., swapped in position) to place the upper waveguide 34 between the upper waveguide taper 32 and the upper waveguide 30. The upper waveguide taper 32 is arranged directly and primarily over the lower waveguide 14, and the upper waveguide 34 is arranged directly and primarily over the lower waveguide taper 12. The lower waveguide 14 is widened and the lower waveguide taper 12 terminates the arrangement of the lower waveguide 10, lower waveguide taper 12, and lower waveguide 14. Similarly, the upper waveguide 34 is widened and the upper waveguide taper 32 terminates the arrangement of the upper waveguide 30, upper waveguide taper 32, and upper waveguide 34.

The lower waveguide 10 and the lower waveguide 14 adjoin at an interface 27 generated by the rearrangement, and the upper waveguide 30 and the upper waveguide 34 adjoin at an interface 31 generated by the rearrangement. In the representative embodiment, the length, L1, of the lower waveguide taper 12 is equal to the length, L3, of the upper waveguide 34, and the length, L2, of the lower waveguide 14 is equal to the length, L4, of the upper waveguide taper 32. The result is that the total length of the lower waveguide taper 12 and lower waveguide 14 is equal to the total length of the upper waveguide taper 32 and upper waveguide 34.

Figure 7:
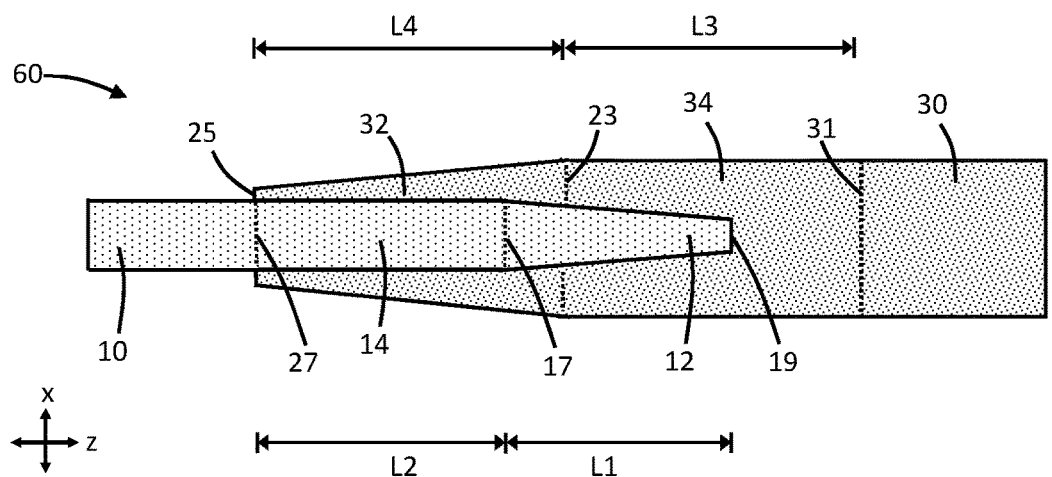

With reference to FIG. 7 in which like reference numerals refer to like features in FIG. 6 and in accordance with alternative embodiments of the invention, a waveguide-towaveguide coupler 60 is a modified version of waveguide-to-waveguide coupler 55 in which the lengths of the lower waveguide taper 12 and lower waveguide 14 have been changed. In particular, the length, L2, of the lower waveguide 14 is less than the length, L4, of the upper waveguide taper 32, and the length, L1, of the lower waveguide taper 12 is less than or equal to the length, L3, of the upper waveguide 34. With these modifications, the total length of the lower waveguide taper 12 and lower waveguide 14 is less than the total length of the upper waveguide taper 32 and upper waveguide 34.

Figure 8:
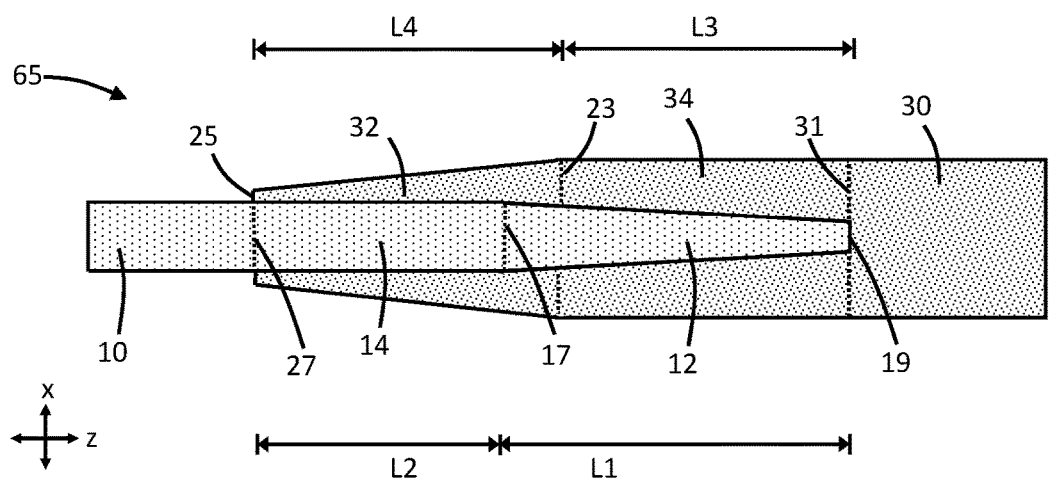

With reference to FIG. 8 in which like reference numerals refer to like features in FIG. 6 and in accordance with alternative embodiments of the invention, a waveguide-to-waveguide coupler 65 is a modified version of waveguide-to-waveguide coupler 55 in which the lengths of the lower waveguide taper 12 and lower waveguide 14 have been changed. In particular, the length, L2, of the lower waveguide 14 is less than the length, L4, of the upper waveguide taper 32, and the length, L1, of the upper waveguide taper 32 is greater than the length, L3, of the upper waveguide 34. With these modifications, the total length of the lower waveguide taper 12 and lower waveguide 14 and the total length of the upper waveguide taper 32 and upper waveguide 34 may be equal or unequal.

Figure 9:
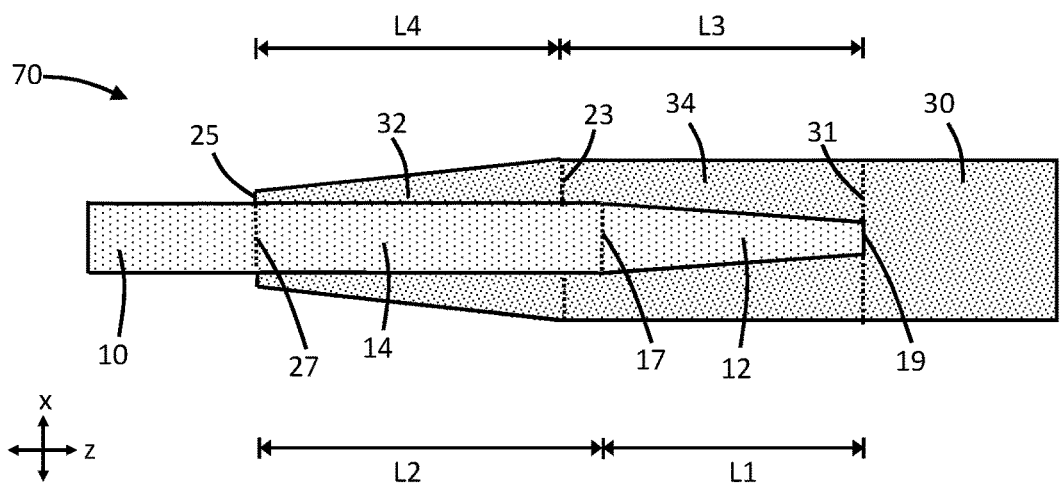

With reference to FIG. 9 in which like reference numerals refer to like features in FIG. 6 and in accordance with alternative embodiments of the invention, a waveguide-to-waveguide coupler 70 is a modified version of waveguide-to-waveguide coupler 55 in which the lengths of the lower waveguide taper 12 and lower waveguide 14 have been changed. In particular, the length, L2, of the lower waveguide 10 is greater than the length, L4, of the upper waveguide taper 32, and the length, L1, of the lower waveguide taper 12 is less than or equal to the length, L3, of the upper waveguide 34. With these modifications, the total length of the lower waveguide taper 12 and lower waveguide 14 and the total length of the upper waveguide taper 32 and upper waveguide 34 may be equal or unequal.

Figure 10:
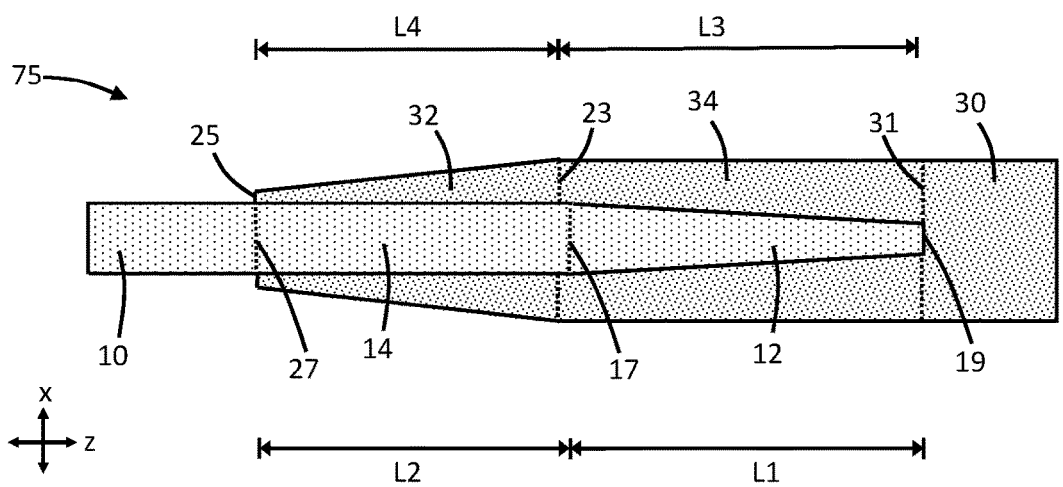

With reference to FIG. 10 in which like reference numerals refer to like features in FIG. 6 and in accordance with alternative embodiments of the invention, a coupler 75 is a modified version of waveguide-to-waveguide coupler 55 in which the length, L2, of the lower waveguide 14 is greater than or equal to the length, L4, of the upper waveguide taper 32, and the length, L1, of the lower waveguide taper 12 is greater than or equal to the original length, L3, of the upper waveguide 34. With these modifications, the total length of the lower waveguide taper 12 and lower waveguide 14 is greater than the total length of the upper waveguide taper 32 and upper waveguide 34.

Figure 11:
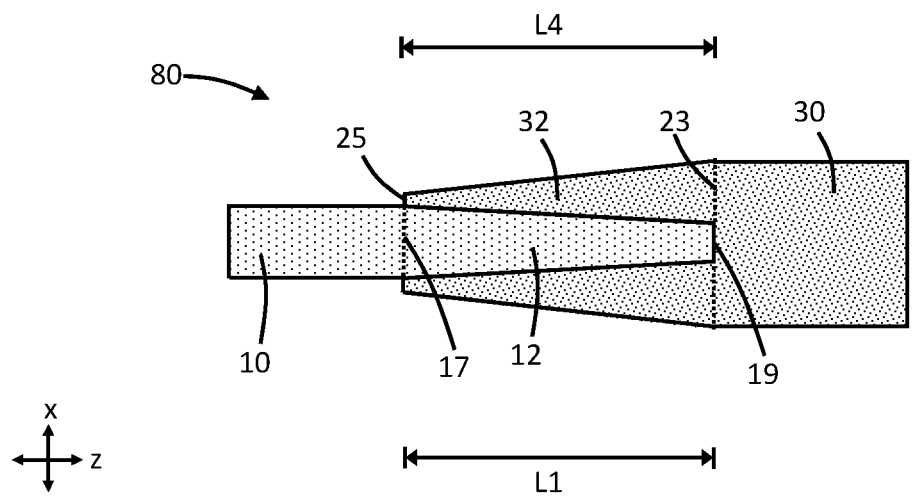
FIG. 11 is a bottom view similar to FIG. 1 of a photonics chip in accordance with alternative embodiments of the invention.

With reference to FIG. 11 in which like reference numerals refer to like features in FIG. 1 and in accordance with alternative embodiments of the invention, a waveguide-to-waveguide coupler 80 is a modified version of waveguide-to-waveguide coupler 15 in which the lower waveguide 14 and the upper waveguide 34 have been eliminated, and the upper waveguide taper 32 is arranged directly and primarily over the lower waveguide taper 12. In the representative embodiment, the length, L1, of the lower waveguide taper 12 is equal to the length, L4, of the upper waveguide taper 32, and the widest end 23 of the upper waveguide taper 32 is coplanar with the end 19 of the lower waveguide taper 12, and the narrowest end 25 of the upper waveguide taper 32 is coplanar with the end 17 of the lower waveguide taper 12. In an alternative embodiment, the length, L1, of the lower waveguide taper 12 may be greater than the length, L4, of the upper waveguide taper 32. In an alternative embodiment, the length, L1, of the lower waveguide taper 12 may be less than the length, L4, of the upper waveguide taper 32.

Figure 12:
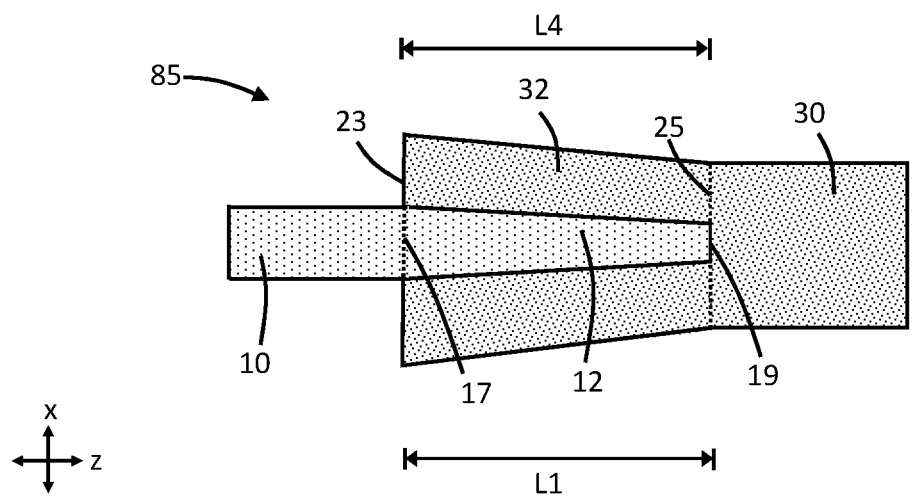
FIG. 12 is a bottom view similar to FIG. 11 of a photonics chip in accordance with alternative embodiments of the invention.

With reference to FIG. 12 in which like reference numerals refer to like features in FIG. 11 and in accordance with alternative embodiments of the invention, a waveguide-to-waveguide coupler 85 is a modified version of waveguide-to-waveguide coupler 80 in which the upper waveguide taper 32 is inverted relative to the lower waveguide taper 12 such that the waveguide tapers 12, 32 taper in the same direction of light propagation. In the representative embodiment, the widest end 23 of the upper waveguide taper 32 is coplanar with the end 17 of the lower waveguide taper 12, and the narrowest end 25 of the upper waveguide taper 32 is coplanar with the end 19 of the lower waveguide taper 12.

Figure 13:
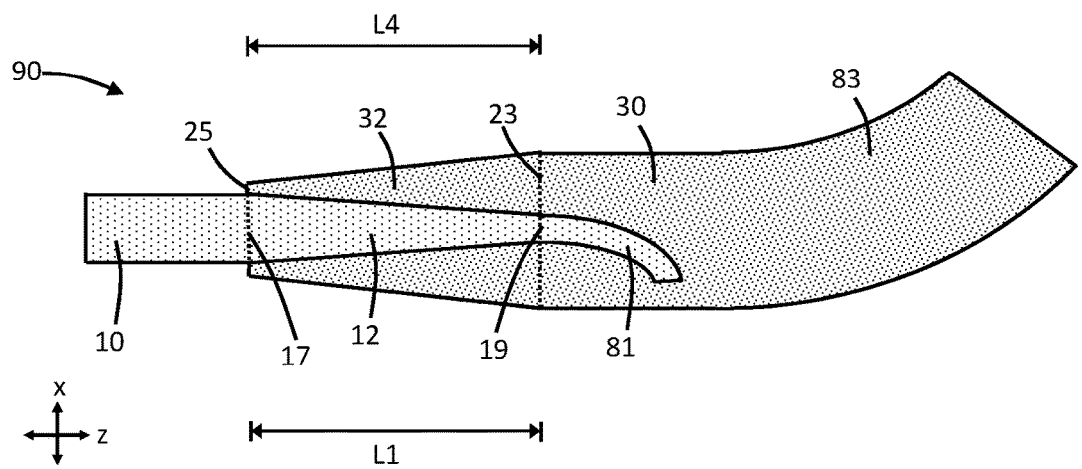
FIG. 13 is a bottom view similar to FIG. 11 of a photonics chip in accordance with alternative embodiments of the invention.

With reference to FIG. 13 in which like reference numerals refer to like features in FIG. 11 and in accordance with alternative embodiments of the invention, a waveguide-to-waveguide coupler 90 includes a lower waveguide bend 81 arranged at an end of the lower waveguide taper 12 and that is connected with the lower waveguide taper 12. The lower waveguide bend 81 is patterned from the device layer of the SOI substrate when the lower waveguide 10 and lower waveguide taper 12 are patterned. The coupler 90 further includes an upper waveguide bend 83 that is arranged at an end of the upper waveguide 30 and that is connected with the upper waveguide 30. The upper waveguide bend 83 is patterned from the deposited dielectric layer when the upper waveguide 30 and upper waveguide taper 32 are patterned. In the representative embodiment, the lower waveguide bend 81 curves in an one direction (i.e., the negative-x direction) and the upper waveguide bend 83 curves in an opposite direction (i.e., the positive-x direction). In alternative embodiments, the lower waveguide bend 81 may curve in either direction and the upper waveguide bend 83 may curve in either direction. In the representative embodiment, the waveguide bends 81 and 83 may have with a fixed curvature in which the radius of curvature is constant along the respective arcs.

In an alternative embodiment, the upper waveguide bend 83 may be connected with upper waveguide taper 32 and the lower waveguide bend 81 may be connected with the lower waveguide 10 such that the arrangement of the waveguide bends 81, 83 is swapped in location with a concomitant change in the propagation direction of the optical signals. In alterative embodiments, the lower waveguide bend 81 and the upper waveguide bend 83 may be added to any of the other embodiments of the couplers described herein. In alternative embodiments, the waveguide bends 81 and 83 may have other types of curvatures, such as curves that follow sine, cosine, or spline functions, as well as spirals, such as Euler spirals, spiros, clothoids, or Cornu spirals.

Figure 14:
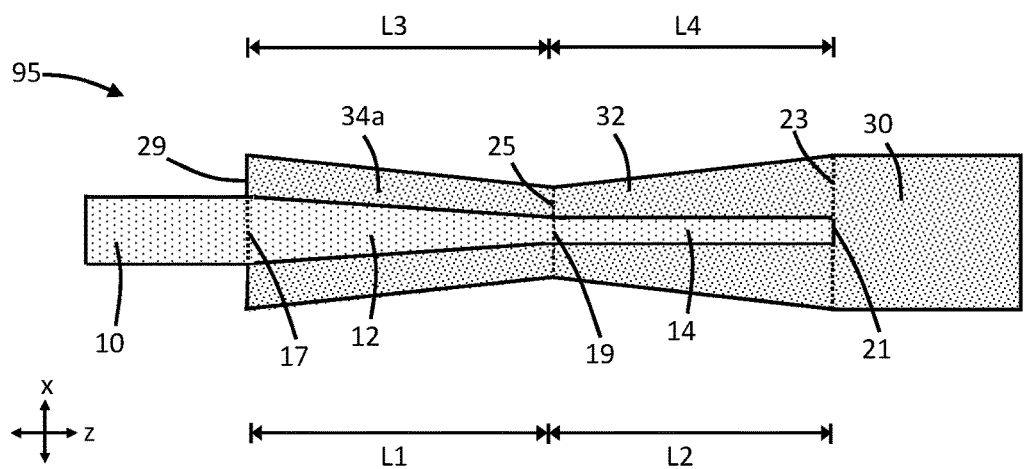
FIG. 14 is a bottom view similar to FIG. 1 of a photonics chip in accordance with alternative embodiments of the invention.

With reference to FIG. 14 in which like reference numerals refer to like features in FIG. 1 and in accordance with alternative embodiments of the invention, a waveguide-to-waveguide coupler 95 is a modified version of waveguide-to-waveguide coupler 15 in which the upper waveguide 34 is replaced by another upper waveguide taper 34a. The tapering of the upper waveguide taper 34a along the centerline 33 from wide end 29 to narrow end 25 may be the reverse of the tapering of the upper waveguide taper 32 such that the narrowest ends 25 of the upper waveguide taper 34a and the upper waveguide taper 32 meet directly over the narrow end 19 of the lower waveguide taper 12.

Figure 15:
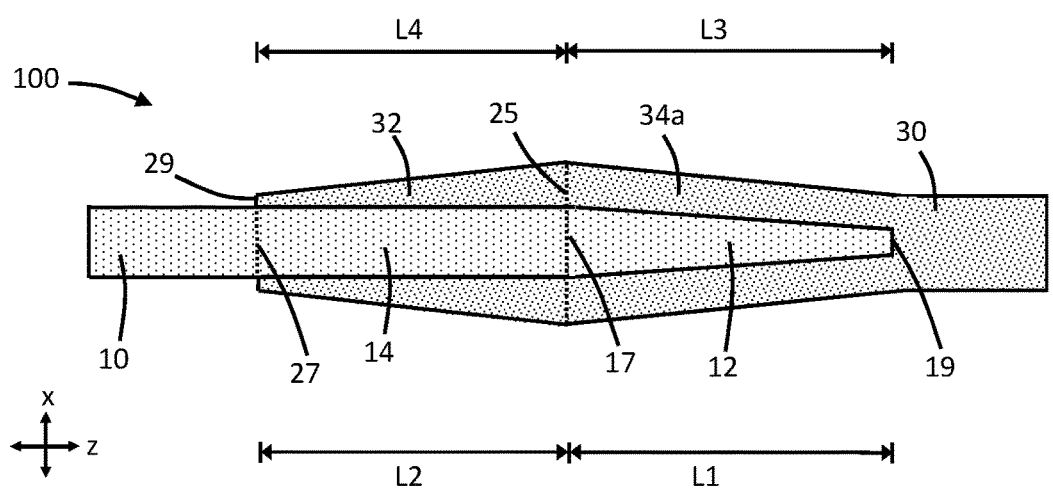
FIG. 15 is a bottom view similar to FIG. 6 of a photonics chip in accordance with alternative embodiments of the invention.

With reference to FIG. 15 in which like reference numerals refer to like features in FIG. 6 and in accordance with alternative embodiments of the invention, a waveguide-towaveguide coupler 100 is a modified version of waveguide-to-waveguide coupler 55 in which the upper waveguide 34 is replaced by another upper waveguide taper 34a. The tapering of the upper waveguide taper 34a along the centerline 33 from narrow end 29 to wide end 25 may be the reverse of the tapering of the upper waveguide taper 32 such that the widest ends 25 of the upper waveguide taper 34a and the upper waveguide taper 32 converge over the end 17 of the lower waveguide taper 12.

The waveguide-to-waveguide couplers described herein may provide adiabatic coupling between waveguide tapers of silicon and silicon nitride with a short and compact footprint, high coupling efficiencies, low back reflections, low loss, and high fabrication-error tolerances. The waveguide tapers may be either cascaded or overlapped in the vertical direction that is perpendicular to the light propagation path. The multilayer dielectric stack arranged between the upper waveguide taper and the lower waveguide taper may facilitate the vertical coupling. The waveguide-to-waveguide couplers may provide highly efficient transmission in which the change of optical mode may be negligible and the transmission efficiency may be near unity.

Figure 16:
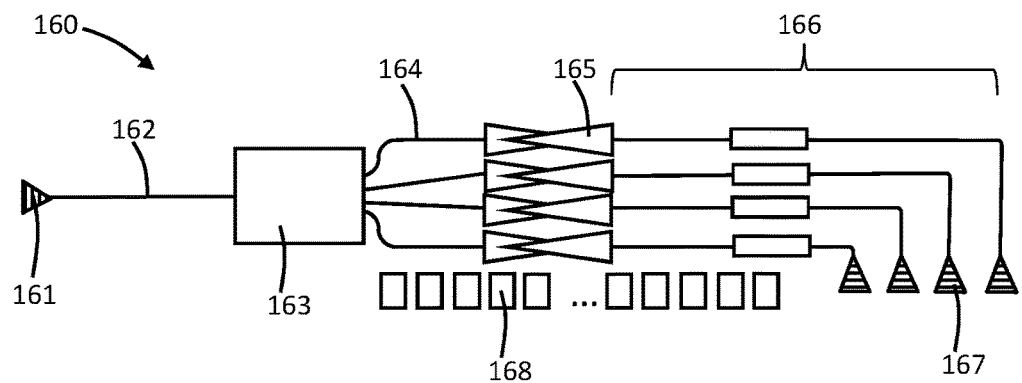
FIG. 16 is a diagrammatic view of a system in accordance with embodiments of the invention.

With reference to FIG. 16 and in accordance with alternative embodiments of the invention, a system 160 integrates silicon nitride waveguides and optical components into a photonics chip comprising a silicon photonics platform. The system 160 includes an input grating coupler 161, a multimode interference (MMI) splitter 163, and a waveguide 162 coupling the input grating coupler 161 with an input of the MMI splitter 163. The waveguide 162 and the MMI splitter 163 may be formed from single-crystal semiconductor material (e.g., single-crystal silicon of an SOI device layer), and the input grating coupler 161 may be formed from a patterned polycrystalline semiconductor material, such as polysilicon. Forming the input grating coupler 161 from polycrystalline semiconductor conductor material avoids the use of a grating coupler at the input of the system 160 that contains silicon nitride.

The MMI splitter 163 may be a 1×N optical device that splits the arriving optical signals at its input among N output optical paths at its output and directs the split optical signals into multiple waveguides 164. In the representative embodiment, the MMI splitter 163 is a 1×4 optical device that receives optical signals from the input grating coupler 161 via the waveguide 162 and splits the optical power into four (4) output optical paths directed by the output of the MMI splitter 163 into the waveguides 164.

The multiple waveguides 164 may also be formed from single-crystal semiconductor material, such as the single-crystal silicon of the device layer. The photonics chip includes sets of on-chip optical components 166 that are formed from silicon nitride. Each set of on-chip optical components 166 may include waveguides and other components that use silicon nitride for optical signal transport. The optical signals in each optical path from the MMI splitter 163 are transferred from each of the waveguides 164 to one of the sets of on-chip optical components 166 by a waveguide-to-waveguide coupler 165, which may be selected from the embodiments of the waveguide-to-waveguide couplers described herein. The waveguide-to-waveguide couplers 165 are arranged such that the single-crystal silicon taper transfers the arriving optical signals to the silicon nitride taper.

In a testing arrangement, the output from the different sets of on-chip optical components 166 may be routed by waveguides, which may include bends and that are among the optical components 166, to respective output grating couplers 167. The output grating couplers 167 may be composed of silicon nitride and may represent optical pads. The system 160 may further include sets of electrical pads 168 that can be used to supply electrical signals to optical components among the sets of on-chip optical components 166 that are powered and/or electronic components. In an alternative embodiment, the electrical pads 168 may be omitted, and the system 160 may only include the output grating couplers 167.

The system 160 may be used either for on-chip optical communications or, in the alternative, as a testing arrangement. In the latter use case that purposes the system 160 for testing, the system 160 may be arranged at the wafer level in a scribe line such that the system 160 is destroyed after when the wafer is diced into individual photonics chips.

Figure 16A:
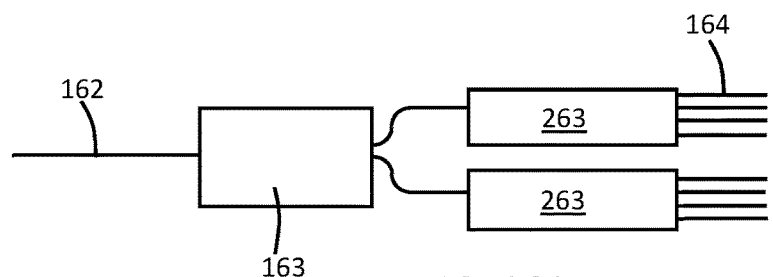
FIG. 16A is a diagrammatic view of a portion of a system in accordance with alternative embodiments of the invention.

In an alternative embodiment and as shown in FIG. 16A, the MMI splitter 163 may be cascaded with additional MMI splitters 263 for further splitting of the optical power and distribution to the multiple waveguides 164. The splitters 263 and the waveguides connecting the splitter 163 with the splitters 263 are formed from the single-crystal silicon of the device layer. Additional combinations, such as 4-way splitter 163 feeding four N/4 way splitters 263, may be used to split the optical power among multiple optical paths on the photonics chip feeding the on-chip optical components 166.

Figure 17:
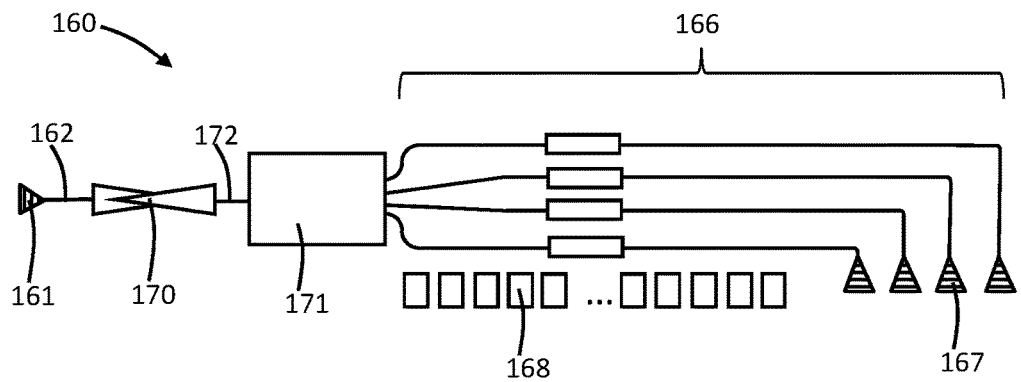
FIG. 17 is a diagrammatic view of a system in accordance with embodiments of the invention.

With reference to FIG. 17 in which like reference numerals refer to like features in FIG. 16 and in accordance with alternative embodiments of the invention, the system 160 may be modified to include a waveguide-to-waveguide coupler 170 that is coupled by the waveguide 162 with the input grating coupler 161. The waveguide-to-waveguide coupler 170 is coupled with the input of an MMI splitter 171 by a waveguide 172. The waveguide-to-waveguide coupler 170 is arranged such that the single-crystal silicon taper transfers the arriving optical signals to the silicon nitride taper, which permits the MMI splitter 171 and waveguide 172 to be composed of silicon nitride. The insertion of the waveguide-to-waveguide coupler 170 before the MMI splitter 171 in the optical path eliminates the need for the waveguide-to-waveguide couplers 165 (FIG. 16) following the output of the MMI splitter 171.

Figure 17A:
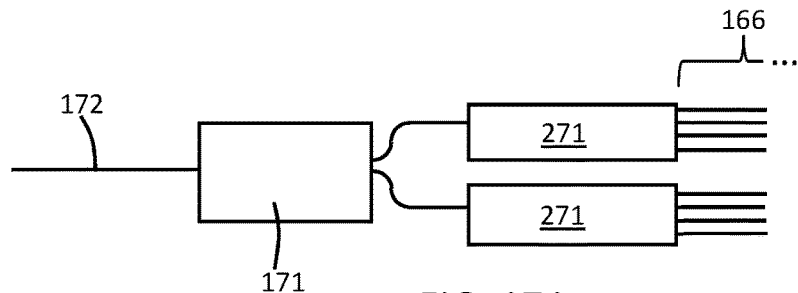
FIG. 17A is a diagrammatic view of a portion of a system in accordance with alternative embodiments of the invention.

In an alternative embodiment and as shown in FIG. 17A, the MMI splitter 171 may be cascaded with additional MMI splitters 271 for further splitting of the optical power and distribution to the on-chip optical components 166. The splitters 271 and the waveguides connecting the MMI splitter 171 with the splitters 271 may be formed from silicon nitride. Additional combinations, such as 4-way splitter 171 feeding four N/4 way splitters 271, may be used to split the optical power among multiple optical paths on the photonics chip feeding on-chip optical components 166.

Figure 18:
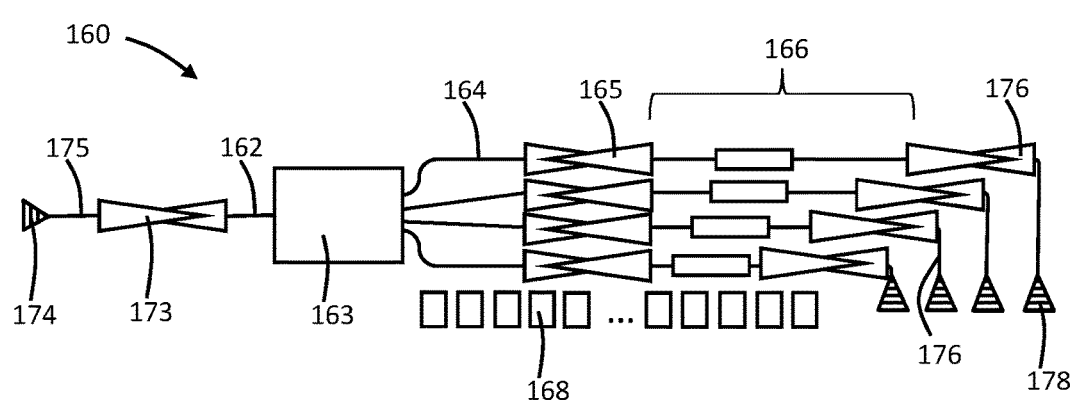
FIGS. 18-21 are diagrammatic views of systems in accordance with embodiments of the invention.

With reference to FIG. 18 in which like reference numerals refer to like features in FIGS. 16-17 and in accordance with alternative embodiments of the invention, the system 160 may be modified to include, at its input, a waveguide-to-waveguide coupler 173 that is coupled with an input grating coupler 174 by a waveguide 175. The input grating coupler 174 and waveguide 175 are composed of silicon nitride. The waveguide-to-waveguide coupler 173 is arranged such that the silicon nitride taper transfers the arriving optical signals to the single-crystal silicon taper.

The system 160 may be further modified to include, at its output, waveguide-to-waveguide couplers 176 and waveguides 177 that couple the sets of on-chip optical components 166 with respective output grating couplers 178. The waveguides 177 may be composed of single-crystal silicon of the device layer and the output grating couplers 176, which represent optical pads, may be composed of polysilicon. The waveguide-to-waveguide couplers 176 are arranged such that the silicon nitride taper transfers the arriving optical signals to the single-crystal silicon taper. The configuration of the system 160 that includes the waveguide-to-waveguide couplers 176 avoids the use of a grating coupler at the output of the system 160 contains silicon nitride.

Figure 19:
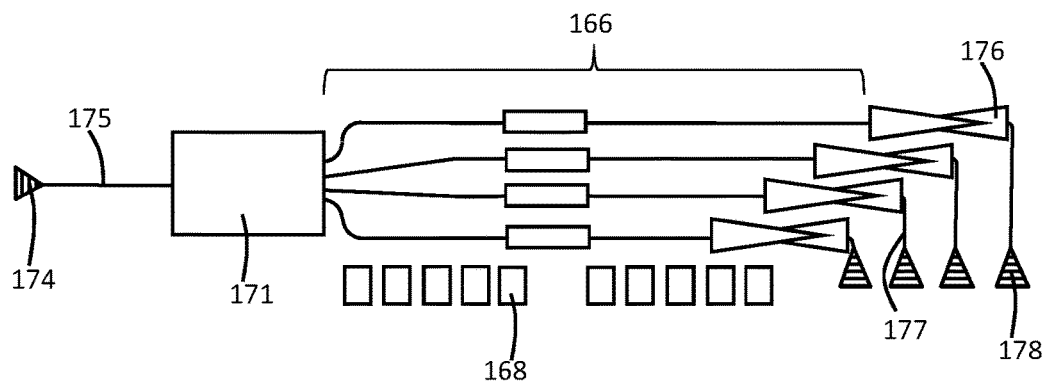

With reference to FIG. 19 in which like reference numerals refer to like features in FIGS. 16-18 and in accordance with alternative embodiments of the invention, the system 160 may be modified to include the input grating coupler 174 that is coupled by the waveguide 175 with the input to the MMI splitter 171. The MMI splitter 171, input grating coupler 174, and waveguide 175 are composed of silicon nitride. The system 160 may be modified to further include, at its output, the waveguide-to-waveguide couplers 176 and waveguides 177 that couple the sets of on-chip optical components 166 with the respective output grating couplers 178. The configuration of the system 160 that includes the waveguide-to-waveguide couplers 176 avoids the use of a grating coupler at the output of the system 160 that contains silicon nitride.

Figure 20:
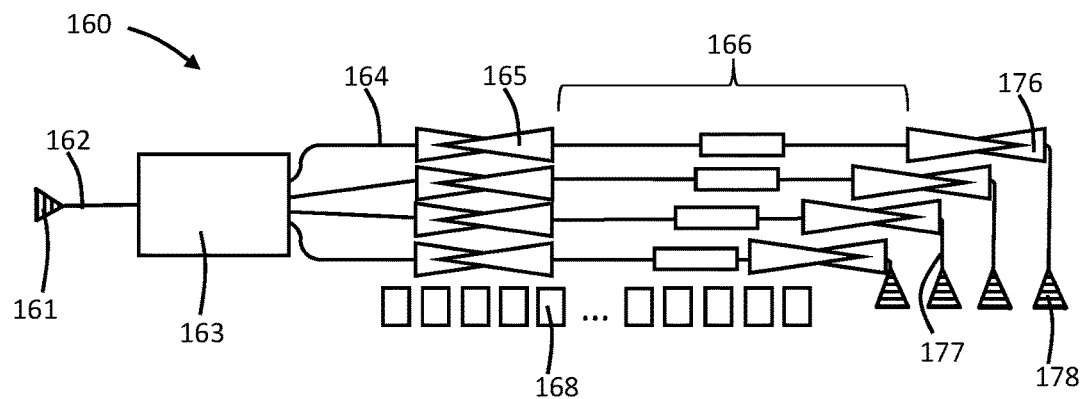

With reference to FIG. 20 in which like reference numerals refer to like features in FIGS. 16-19 and in accordance with alternative embodiments of the invention, the system 160 of FIG. 16 may be modified to include the waveguide-to-waveguide couplers 176, which avoids the use of a grating coupler at the output of the system 160 that contains silicon nitride. The input grating coupler 161 also avoids the use of a grating coupler at the input of the system 160 that contains silicon nitride.

Figure 21:
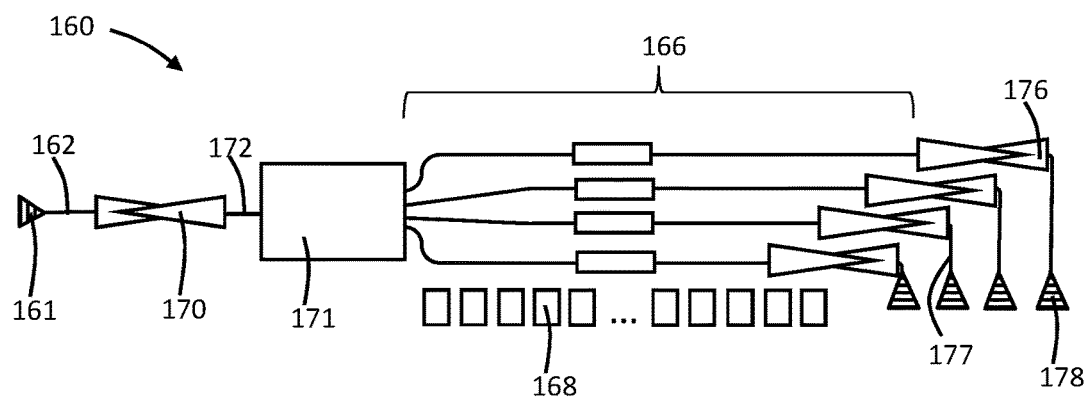

With reference to FIG. 21 in which like reference numerals refer to like features in FIGS. 16-20 and in accordance with alternative embodiments of the invention, the system 160 of FIG. 17 may be modified to include the waveguide-to-waveguide couplers 176 and output grating couplers 178, which avoids the use of a grating coupler at the output of the system 160 that contains silicon nitride. The input grating coupler 161 also avoids the use of a grating coupler at the input of the system 160 that contains silicon nitride.

Figure 22:
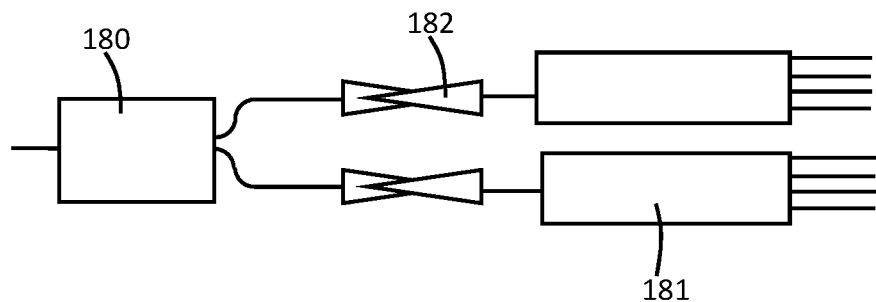
FIGS. 22 and 23 are diagrammatic views of MMI splitters for use with the systems of FIGS. 17-21 in accordance with embodiments of the invention
Figure 23:
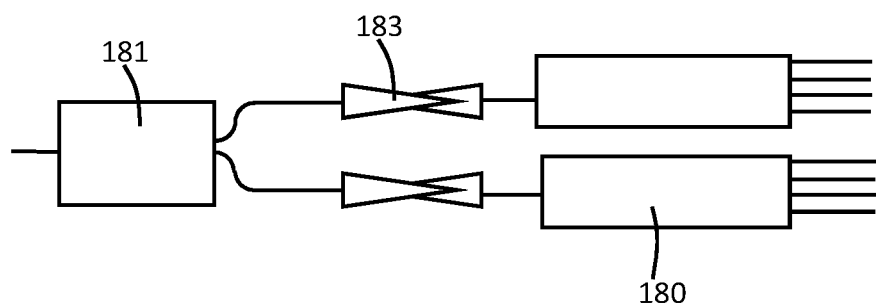

With reference to FIGS. 22-23 in which like reference numerals refer to like features in FIGS. 16-21 and in accordance with alternative embodiments of the invention, the configurations of the system 160 may be modified to include a mixture of one or more MMI couplers 180 that are composed of single-crystal silicon and one or more MMI couplers 181 that are composed of silicon nitride. As shown in FIG. 22, an MMI coupler 180 is coupled with multiple MMI couplers 181 by waveguide-to-waveguide couplers 182 are arranged such that the single-crystal silicon taper transfers the arriving optical signals to the silicon nitride taper. As shown in FIG. 23, an MMI coupler 181 is coupled with multiple MMI couplers 180 by waveguide-to-waveguide couplers 183 that are arranged such that the single-crystal silicon taper transfers the arriving optical signals to the silicon nitride taper.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. In the latter case, the chip is mounted in a single chip package (e.g., a plastic carrier, with leads that are affixed to a motherboard or other higher level carrier) or in a multichip package (e.g., a ceramic carrier that has either or both surface interconnections or buried interconnections). In any case, the chip may be integrated with other chips, discrete circuit elements, and/or other signal processing devices as part of either an intermediate product or an end product.

References herein to terms such as "vertical", "horizontal", "lateral", etc. are made by way of example, and not by way of limitation, to establish a frame of reference. Terms such as "horizontal" and "lateral" refer to a direction in a plane parallel to a top surface of a semiconductor substrate, regardless of its actual three-dimensional spatial orientation. Terms such as "vertical" and "normal" refer to a direction perpendicular to the "horizontal" direction. Terms such as "above" and "below" indicate positioning of elements or structures relative to each other and/or to the top surface of the semiconductor substrate as opposed to relative elevation.

A feature "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a waveguide-to-waveguide coupler, the structure comprising:
   a first waveguide taper;
   a first waveguide coupled to the first waveguide taper, the first waveguide and the first waveguide taper having a first arrangement in which the first waveguide terminates the first arrangement;
   a second waveguide taper; and
   a second waveguide coupled to the second waveguide taper, the second waveguide and the second waveguide taper having a second arrangement in which the second waveguide terminates the second arrangement,
   wherein the first waveguide and the first waveguide taper are comprised of silicon, the second waveguide and the second waveguide taper are comprised of silicon nitride, the second waveguide is arranged in a vertical direction directly and primarily over the first waveguide taper, and the second waveguide taper is arranged in the vertical direction directly and primarily over the first waveguide.

2. The structure of claim 1 further comprising:
   a plurality of dielectric layers arranged in a layer stack in the vertical direction between the first waveguide taper and the second waveguide taper.

3. The structure of claim 2 wherein the plurality of dielectric layers in the layer stack includes a first silicon dioxide layer, a second silicon dioxide layer, and a silicon nitride layer arranged in the vertical direction between the first silicon dioxide layer and the second silicon dioxide layer.

4. The structure of claim 1 wherein the first waveguide taper has a first length and tapers along the first length from a first end having a first width to a second end having a second width, the second waveguide taper has a second length and tapers along the second length from a first end having a first width to a second end having a second width, and the second end of the first waveguide taper is adjacent to the second end of the second waveguide taper.

5. The structure of claim 1 wherein the first waveguide taper has a first length and tapers along the first length from a first end having a first width to a second end having a second width, the second waveguide taper has a second length and tapers along the second length from a first end having a first width to a second end having a second width, and the first end of the first waveguide taper is adjacent to the first end of the second waveguide taper.

6. The structure of claim 1 wherein the first waveguide taper is tapered in a first direction and the second waveguide taper is tapered in a second direction opposite to the first direction.

7. The structure of claim 6 wherein the first waveguide taper has a first length and a first width that narrows along the first length, the second waveguide taper has a second length and a second width that narrows along the second length, and the first width at any position along the first length is less than the second width at any position along the second length.

8. The structure of claim 1 further comprising:
an interlayer dielectric layer over the second waveguide taper, the interlayer dielectric layer having a refractive index in a mid-infrared wavelength range that is less than a refractive index of silicon dioxide.

9. The structure of claim 1 further comprising:
an interlayer dielectric layer over the second waveguide taper and the second waveguide, the interlayer dielectric layer having a refractive index in a mid-infrared wavelength range that is less than a refractive index of silicon dioxide.

10. A system comprising:
an input grating coupler;
a first plurality of optical components comprised of silicon nitride;
a second plurality of optical components comprised of silicon nitride;
a multimode interference splitter arranged to couple with the input grating coupler with the first plurality of optical components and with the second plurality of optical components; and
a first waveguide-to-waveguide coupler arranged in a first optical path between the input grating coupler and the multimode interference splitter or in a second optical path that includes the first plurality of optical components, the first waveguide-to-waveguide coupler including a first waveguide taper, a first waveguide coupled to the first waveguide taper, a second waveguide, and a second waveguide taper coupled to the second waveguide, the first waveguide and the first waveguide taper of the first waveguide-to-waveguide coupler comprised of single-crystal silicon, the first waveguide and the first waveguide taper of the first waveguide-to-waveguide coupler having a first arrangement in which the first waveguide terminates the first arrangement, the second waveguide and the second waveguide taper of the first waveguide-to-waveguide coupler having a second arrangement in which the second waveguide terminates the second arrangement, the second waveguide and the second waveguide taper of the first waveguide-to-waveguide coupler comprised of silicon nitride, the second waveguide of the first waveguide-to-waveguide coupler arranged in a vertical direction directly and primarily over the first waveguide taper of the first waveguide-to-waveguide coupler, and the second waveguide taper of the first waveguide-to-waveguide coupler arranged in the vertical direction directly and primarily over the first waveguide of the first waveguide-to-waveguide coupler.

11. The system of claim 10 wherein the first waveguide-to-waveguide coupler is arranged in the first optical path between the input grating coupler and the multimode interference splitter, and further comprising:
a second waveguide-to-waveguide coupler arranged in the second optical path between the multimode interference splitter and the first plurality of optical components, the second waveguide-to-waveguide coupler including a first waveguide taper comprised of single-crystal silicon and a second waveguide taper comprised of silicon nitride, and the second waveguide taper of the second waveguide-to-waveguide coupler arranged in the vertical direction over the first waveguide taper of the first waveguide-to-waveguide coupler.

12. The system of claim 10 wherein the first waveguide-to-waveguide coupler is arranged in the first optical path between the input grating coupler and the multimode interference splitter, and the multimode interference splitter is comprised of silicon nitride.

13. The system of claim 10 wherein the first waveguide-to-waveguide coupler is arranged in the second optical path between the multimode interference splitter and the first plurality of optical components, and the multimode interference splitter is comprised of single-crystal silicon.

14. The system of claim 10 further comprising:
an output grating coupler,
wherein the first waveguide-to-waveguide coupler is arranged in the second optical path between the multimode interference splitter and the output grating coupler.

15. A method of forming a waveguide-to-waveguide coupler, the method comprising:
patterning a semiconductor layer to form a first waveguide taper and a first waveguide coupled to the first waveguide taper;
depositing a dielectric layer over the first waveguide taper and the first waveguide; and
patterning the dielectric layer to form a second waveguide taper and a second waveguide coupled to the second waveguide taper,
wherein the first waveguide and the first waveguide taper have a first arrangement in which the first waveguide terminates the first arrangement, the second waveguide and the second waveguide taper have a second arrangement in which the second waveguide terminates the second arrangement the semiconductor layer is comprised of silicon, the dielectric layer is comprised of silicon nitride, the second waveguide is arranged in a vertical direction directly and primarily over the first waveguide taper, and the second waveguide taper is arranged in the vertical direction directly and primarily over the first waveguide.

16. The method of claim 15 further comprising:
forming a layer stack arranged in the vertical direction between the first waveguide taper and the second waveguide taper,
wherein the layer stack includes a first silicon dioxide layer, a second silicon dioxide layer, and a silicon nitride layer arranged in the vertical direction between the first silicon dioxide layer and the second silicon dioxide layer.

17. The structure of claim 1 wherein the first waveguide has a first length and a first width that is constant over the first length, and the second waveguide has a second length and a second width that is constant over the second length.

18. The system of claim 10 wherein the first waveguide has a first length and a first width that is constant over the first length, and the second waveguide has a second length and a second width that is constant over the second length.

19. The method of claim 15 wherein the first waveguide has a first length and a first width that is constant over the first length, and the second waveguide has a second length and a second width that is constant over the second length.

\* \* \* \* \*